(12) United States Patent
Cho et al.

(10) Patent No.: US 10,714,949 B2
(45) Date of Patent: ***Jul. 14, 2020

(54) BATTERY PACKS FOR PROVIDING DIFFERENT POWER SOURCES AND METHODS OF CHARGING BATTERY PACKS

(71) Applicant: Samsung Electronics Co., Ltd., Suwon-si, Gyeonggi-do (KR)

(72) Inventors: Joon-Kee Cho, Yongin-si (KR); ChangHyun Roh, Seoul (KR); Youngbo Shim, Seoul (KR); Byung-Kwon Choi, Suwon-si (KR); Taesin Ha, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,268

(22) Filed: Apr. 22, 2019

(65) Prior Publication Data

US 2019/0252892 A1    Aug. 15, 2019

Related U.S. Application Data

(63) Continuation of application No. 14/743,608, filed on Jun. 18, 2015, now Pat. No. 10,298,029.

(30) Foreign Application Priority Data

Jul. 29, 2014   (KR) .................. 10-2014-0096308

(51) Int. Cl.
*H02J 7/00*   (2006.01)
(52) U.S. Cl.
CPC .......... *H02J 7/0021* (2013.01); *H02J 7/0048* (2020.01); *H02J 7/007* (2013.01); *H02J 2207/40* (2020.01)

(58) Field of Classification Search
CPC ........ H02J 7/007; H02J 7/0021; H02J 7/0055; H02J 7/0048
(Continued)

(56) References Cited

U.S. PATENT DOCUMENTS 6,791,295 B1    9/2004  Berels
8,723,457 B2 *  5/2014  Komatsu ................. B60L 58/20
                                                318/139
(Continued)

FOREIGN PATENT DOCUMENTS

JP    2010135549 A    6/2010
KR    20030043946 A   6/2003
KR    20140046069 A   4/2014

OTHER PUBLICATIONS

Non-Final Office Action dated Jan. 27, 2017 issued in U.S. Appl. No. 14/743,608.
(Continued)

*Primary Examiner* — Edward Tso
*Assistant Examiner* — Aaron Piggush
(74) *Attorney, Agent, or Firm* — Harness, Dickey & Pierce, P.L.C.

(57) ABSTRACT

A battery pack for providing different power sources may include: a low voltage battery configured to supply a first voltage; a high voltage battery configured to supply a second voltage, the second voltage being higher than the first voltage; a charging circuit configured to charge the low voltage battery using the high voltage battery; and/or a controller configured to control the charging circuit to charge the low voltage battery when a charge state of the low voltage battery is less than a desired charge state.

17 Claims, 5 Drawing Sheets

(58) Field of Classification Search
USPC .................................. 320/103, 112, 137, 163
See application file for complete search history.

(56) References Cited

U.S. PATENT DOCUMENTS

| | | | |
|---|---|---|---|
| 10,298,029 B2* | 5/2019 | Cho ..................... | H02J 7/0021 |
| 2009/0195217 A1 | 8/2009 | Choi et al. | |
| 2011/0169448 A1 | 7/2011 | Ichikawa | |
| 2012/0029399 A1 | 2/2012 | Sankai | |
| 2012/0123625 A1 | 5/2012 | Ueo et al. | |
| 2012/0299377 A1* | 11/2012 | Masuda .................. | B60L 50/51 |
| | | | 307/10.1 |

OTHER PUBLICATIONS

Final Office Action dated Aug. 11, 2017 issued in U.S. Appl. No. 14/743,608.
Non-Final Office Action dated Dec. 28, 2017 issued in U.S. Appl. No. 14/743,608.
Final Office Action dated Jul. 16, 2018 issued in U.S. Appl. No. 14/743,608.
Notice of Allowance dated Jan. 4, 2019 issued in U.S. Appl. No. 14/743,608.

* cited by examiner

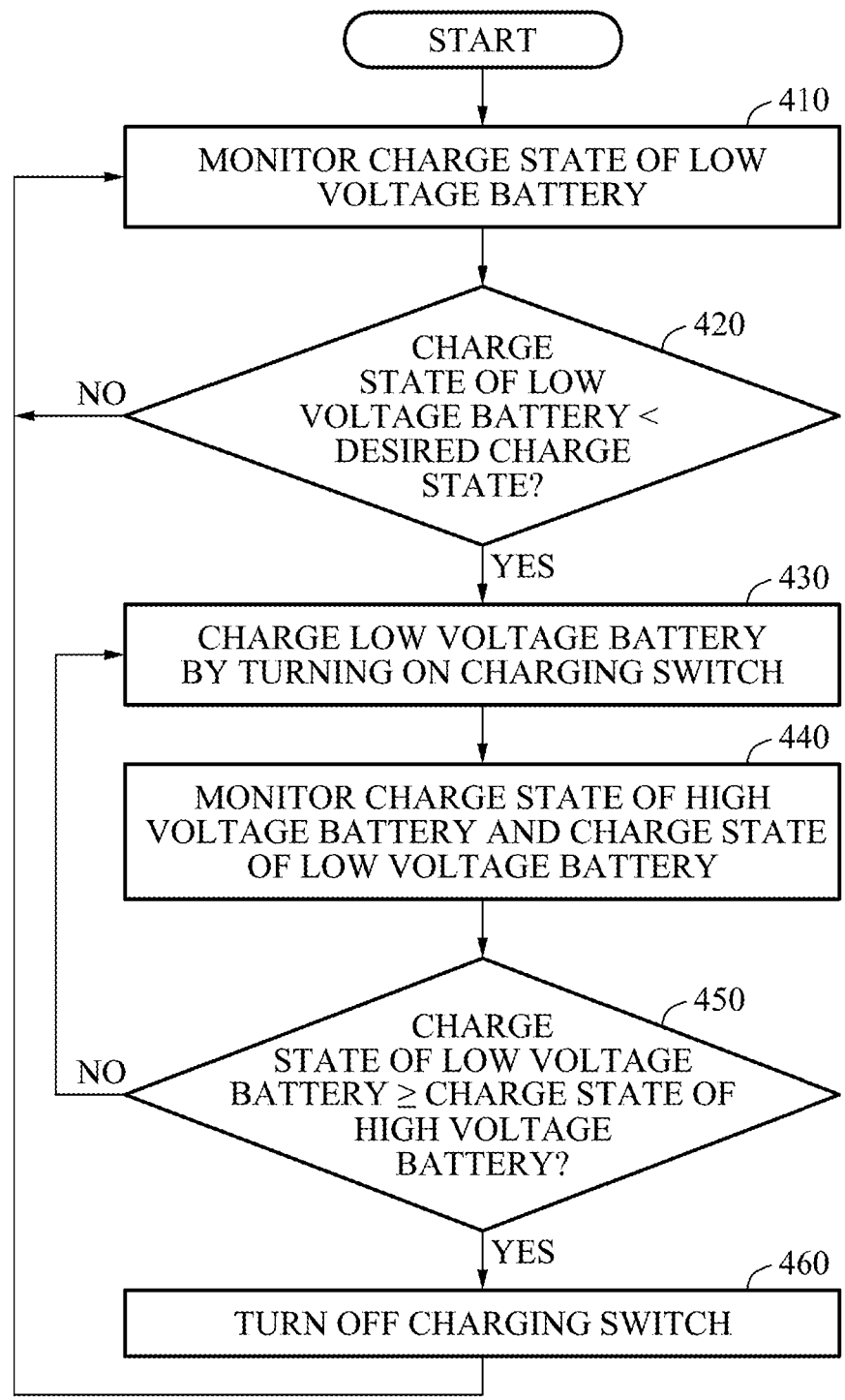

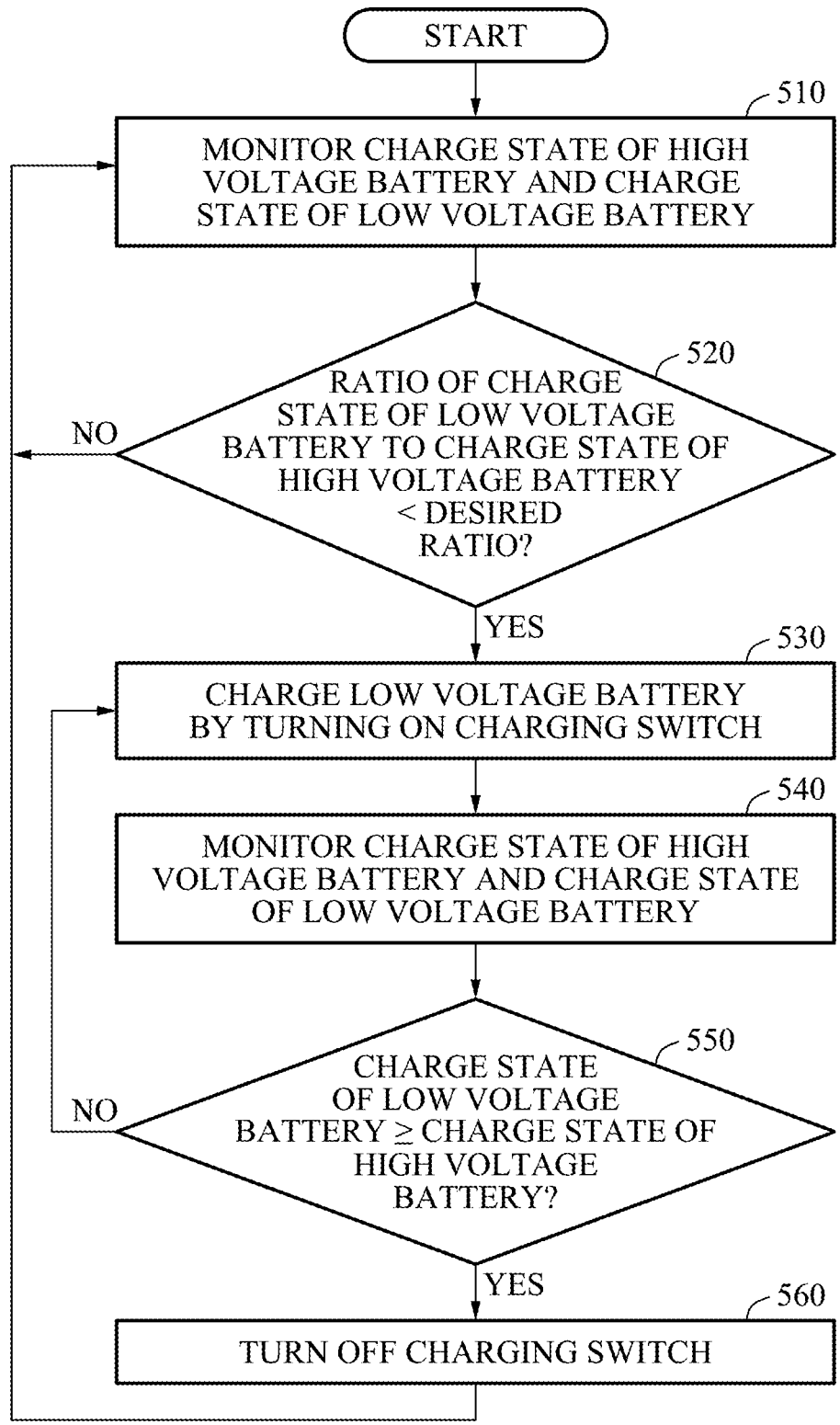

BATTERY PACKS FOR PROVIDING DIFFERENT POWER SOURCES AND METHODS OF CHARGING BATTERY PACKS

CROSS-REFERENCE TO RELATED APPLICATION(S)

This application is a continuation of U.S. application Ser. No. 14/743,608, filed on Jun. 18, 2015, which claims priority from Korean Patent Application No. 10-2014-0096308, filed on Jul. 29, 2014, in the Korean Intellectual Property Office (KIPO), the entire contents of each of which are incorporated herein by reference.

BACKGROUND

1. Field

Some example embodiments may relate generally to battery packs for providing different power sources, and/or methods of charging the battery packs. Some example embodiments may relate generally to battery packs for providing different power sources, and/or methods of charging the battery packs that may monitor charge states of each of the batteries included in the battery packs and/or may charge the batteries.

2. Description of Related Art

Monitoring systems for monitoring the charge states of batteries in portable electronic devices, while the batteries supply power to the portable electronic devices, may have been used.

When the monitored charge state reaches a predetermined reserve capacity, or when a voltage of the battery reaches a predetermined termination voltage, the monitoring system may change a state of the portable electronic device to a low-power-use state.

However, when a battery providing a single power source is used in a portable electronic device requiring different power sources that supply different voltages, power may be lost by voltage conversion circuits, despite a simple system configuration.

Additionally, when at least two batteries used as different power sources are not collectively managed, a charge state of each of the batteries may be changed, which may have an influence on operation of at least one system to which power is supplied by each of the batteries.

SUMMARY

Some example embodiments may provide battery packs for providing different power sources.

Some example embodiments may provide methods of charging battery packs.

In some example embodiments, a battery pack for providing different power sources may comprise: a low voltage battery configured to supply a first voltage; a high voltage battery configured to supply a second voltage, the second voltage being higher than the first voltage; a charging circuit configured to charge the low voltage battery using the high voltage battery; and/or a controller configured to control the charging circuit to charge the low voltage battery when a charge state of the low voltage battery is less than a desired charge state.

In some example embodiments, the battery pack may further comprise: a charging switch configured to connect the high voltage battery to the charging circuit.

In some example embodiments, when the charge state of the low voltage battery is less than the desired charge state, the controller may turn on the charging switch to allow the low voltage battery to be charged.

In some example embodiments, the battery pack may further comprise: a monitor configured to monitor the charge state of the low voltage battery and a charge state of the high voltage battery.

In some example embodiments, the monitor may be configured to transmit information on the charge state of the low voltage battery and the charge state of the high voltage battery to the controller.

In some example embodiments, when a ratio of the charge state of the low voltage battery to the charge state of the high voltage battery is less than a desired ratio, the controller may be configured to control the charging circuit to charge the low voltage battery.

In some example embodiments, when the charge state of the low voltage battery is equal to or greater than the charge state of the high voltage battery, the controller may be configured to control the charging circuit to interrupt charging of the low voltage battery.

In some example embodiments, the first voltage may be configured to drive a circuit.

In some example embodiments, the second voltage may be configured to drive a motor.

In some example embodiments, the controller may be configured to control the charging circuit based on a charging control signal received from an external apparatus.

In some example embodiments, during charging of the low voltage battery, the controller may be configured to control power to be supplied to an external apparatus using the high voltage battery.

In some example embodiments, a charging control chip for controlling charging of a battery pack for providing different power sources may comprise: a monitor configured to monitor a charge state of a low voltage battery and a charge state of a high voltage battery, the low voltage battery being configured to supply a first voltage, the high voltage battery being configured to supply a second voltage, and the second voltage being higher than the first voltage; a charging circuit configured to charge the low voltage battery using the high voltage battery; and/or a charging switch configured to connect the charging circuit to a connection terminal of the high voltage battery, and configured to be turned on or off based on the charge state of the low voltage battery.

In some example embodiments, the charging switch may be turned on or off based on a charging control signal received from an external apparatus.

In some example embodiments, the charging control chip may further comprise: a controller configured to turn on the charging switch when the charge state of the low voltage battery is less than a desired charge state.

In some example embodiments, when a ratio of the charge state of the low voltage battery to the charge state of the high voltage battery is less than a desired ratio, the controller may be configured to turn on the charging switch.

In some example embodiments, when the charge state of the low voltage battery is equal to or greater than the charge state of the high voltage battery, the controller may be configured to turn off the charging switch.

In some example embodiments, a method of charging a battery pack for providing different power sources may comprise: turning on a charging switch when a charge state of a low voltage battery having a first voltage is less than a desired charge state, the charging switch being configured to connect a high voltage battery having a second voltage to a charging circuit of the low voltage battery, and the second voltage being higher than the first voltage; and/or charging, by the charging circuit, the low voltage battery using the high voltage battery.

In some example embodiments, the method may further comprise: turning off the charging switch when the charge state of the low voltage battery is equal to or greater than a charge state of the high voltage battery.

In some example embodiments, the first voltage may be configured to drive a circuit, and wherein the second voltage may be configured to drive a motor.

In some example embodiments, the turning on of the charging switch may comprise: monitoring the charge state of the low voltage battery and a charge state of the high voltage battery; and/or comparing the monitored charge state of the low voltage battery to the desired charge state based on information on the monitored charge states.

In some example embodiments, the turning on of the charging switch may comprise, when a ratio of the charge state of the low voltage battery to a charge state of the high voltage battery is less than a desired ratio, turning on the charging switch.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 4 illustrates an example of a method of charging a battery pack for providing different power sources according to some example embodiments; and FIG. 5 illustrates another example of a method of charging a battery pack for providing different power sources according to some example embodiments.

DETAILED DESCRIPTION

Figure 1:
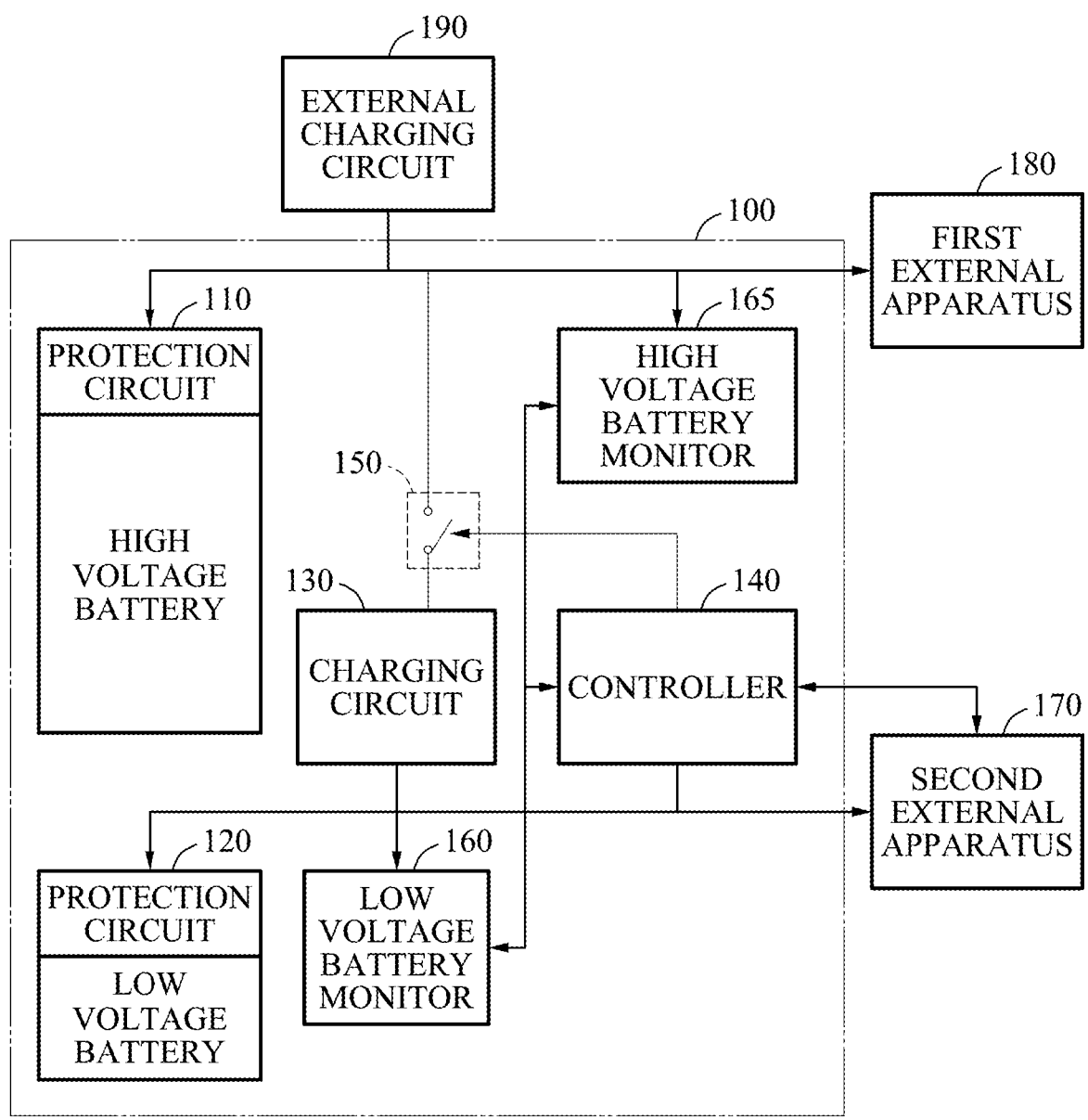
FIG. 1 illustrates a battery pack for providing different power sources according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Reference will now be made to example embodiments, which are illustrated in the accompanying drawings, wherein like reference numerals may refer to like components throughout.

FIG. 1 illustrates a battery pack 100 for providing different power sources according to some example embodiments.

Referring to FIG. 1, the battery pack 100 may include a high voltage battery 110, a low voltage battery 120, a charging circuit 130, a controller 140, a charging switch 150, a low voltage battery monitor 160, and a high voltage battery monitor 165.

The battery pack 100 may be used in an apparatus requiring different power sources. In an apparatus including components requiring different power sources, for example, a motor, an electronic circuit, and the like, batteries required by components may have different specifications. A specification of a battery may include, for example, a voltage level, an instantaneous discharge current, an energy density, a weight, and a size of the battery, and the like.

An apparatus requiring different power sources may include, for example, a motion assistance apparatus, a motion assistance robot, a wearable device for assisting a movement of a user, and the like. Each of the motion assistance apparatus, the motion assistance robot, the wearable device, and the like may typically operate, using a motor, a driver configured to assist a movement of a user, and may control the driver using a processor, and the like. A specification of a battery required by the driver may be different from a specification of a battery required by the processor.

For example, the motor may require an instantaneous energy supply and, accordingly, a battery with a high instantaneous discharge current may be required. Conversely, a typical circuit requires a continuous energy supply and, accordingly, a battery with a low voltage and a high energy density may be required.

Due to diversification of a configuration of an apparatus as described above, power sources required by each component may have different specifications. For example, when a battery for providing a single power source is used, an apparatus requiring different power sources may be operated. However, a voltage conversion circuit may be required to supply power required for each component. When the voltage conversion circuit is used, power may be lost during voltage conversion.

Additionally, a single battery satisfying all specifications of batteries required for each of components of an apparatus may be employed. However, it may be difficult to select an optimum battery due to different specifications required by the apparatus, for example, a weight or a size of a battery.

The battery pack 100 may include at least two batteries as different power sources suitable for specifications of batteries required for each of components of an apparatus.

For convenience of description, the following description is mainly based on the battery pack 100 including the low voltage battery 120 configured to supply a first voltage and the high voltage battery 110 configured to supply a second voltage that is higher than the first voltage. However, there is no limitation thereto, and it is obvious to one of ordinary skill in the art that the battery pack 100 may provide different power sources and may include a plurality of batteries with different specifications.

The high voltage battery 110 may supply the second voltage. The second voltage may be higher than the first voltage supplied by the low voltage battery 120. For example, the high voltage battery 110 may supply a high voltage to drive a motor, and may have a high instantaneous discharge current. Additionally, the low voltage battery 120 may have a high energy density and may supply a low voltage, because a continuous power supply is required to drive an electronic circuit.

Referring to FIG. 1, a first external apparatus 180 may receive a power supply from the high voltage battery 110, and a second external apparatus 170 may receive a power supply from the low voltage battery 120. As described above, the high voltage battery 110 may be selected to have a battery specification required by the first external apparatus 180. Additionally, the low voltage battery 120 may be selected to have a battery specification required by the second external apparatus 170.

Accordingly, a specification of each of the high voltage battery 110 and the low voltage battery 120 may be selected to satisfy a specification suitable for each of components in an apparatus requiring different power sources, and the selected specification may be applied to the battery pack 100. Each of the high voltage battery 110 and the low voltage battery 120 may include a protection circuit configured to protect a battery against overcharge, over discharge, overcurrent, and the like.

The charging circuit 130 may charge the low voltage battery 120 using the high voltage battery 110. The charging circuit 130 included in the battery pack 100 may charge the low voltage battery 120 using an external power source or the high voltage battery 110.

In a battery pack including a plurality of different batteries as power sources, a charge state of each of the batteries may be changed based on a driving state of an external apparatus. For example, a first external apparatus to which power is supplied by a first battery may consume a large amount of power, in comparison to a second external apparatus to which power is supplied by a second battery. In some example embodiments, a charge state of the first battery may be less than a charge state of the second battery.

Additionally, when the first battery needs to be charged by an external power source, the entire battery pack may need to be charged despite electric charges remaining in the second battery. In addition, when the entire battery pack is not charged by the external power source, the first external apparatus may not normally operate.

The charging circuit 130 in the battery pack 100 may charge the low voltage battery 120 using the high voltage battery 110 and, accordingly, the entire battery pack 100 may not need to be charged, despite a low charge state of the low voltage battery 120.

The high voltage battery 110 may be charged by an external charging circuit 190 using an external power source. The external charging circuit 190 configured to charge the high voltage battery 110 may also be included in the battery pack 100. However, due to a weight and a size of the battery pack 100, the external charging circuit 190 may not be included in the battery pack 100 so that the high voltage battery 110 may be charged using the external power source.

The controller 140 may control the charging circuit 130 to charge the low voltage battery 120, when the charge state of the low voltage battery 120 is less than a desired charge state (that may or may not be predetermined). For example, when the low voltage battery 120 reaches a desired reserve capacity (that may or may not be preset) or a desired termination voltage (that may or may not be preset), the controller 140 may control the charging circuit 130 to charge the low voltage battery 120.

Additionally, when a ratio of the charge state of the low voltage battery 120 to a charge state of the high voltage battery 110 is less than a desired ratio (that may or may not be predetermined), the controller 140 may control the charging circuit 130 to charge the low voltage battery 120. Thus, based on both the charge state of the low voltage battery 120 and the charge state of the high voltage battery 110, it is possible to prevent the charge state of the low voltage battery 120 and the charge state of the high voltage battery 110 from being excessively different from each other, and to efficiently utilize the high voltage battery 110 and the low voltage battery 120 as power sources.

When the charge state of the low voltage battery 120 is equal to or greater than the charge state of the high voltage battery 110, the controller 140 may control the charging circuit 130 to interrupt charging of the low voltage battery 120. For example, when the charge state of the low voltage battery 120 is equal to or greater than the charge state of the high voltage battery 110, the controller 140 may determine that charging of the low voltage battery 120 using the high voltage battery 110 is completed, and may control the charging circuit 130 to interrupt the charging.

The controller 140 may supply power to the second external apparatus 170 using the high voltage battery 110, instead of using the low voltage battery 120, when the low voltage battery 120 is being charged using the high voltage battery 110. Because the low voltage battery 120 is charged using the high voltage battery 110, the second external apparatus 170 may be normally operated using the high voltage battery 110 during the charging of the low voltage battery 120.

The charging switch 150 may be connected between the high voltage battery 110 and the charging circuit 130. For example, when the charge state of the low voltage battery 120 is equal to or greater than the desired charge state (that may or may not be predetermined), the charging switch 150 may be turned off, to prevent the low voltage battery 120 from being charged using the high voltage battery 110.

When the charge state of the low voltage battery 120 is less than the desired charge state (that may or may not be predetermined), the charging switch 150 may be turned on and may connect the high voltage battery 110 to the charging circuit 130, to allow the low voltage battery 120 to be charged using the high voltage battery 110.

When the ratio of the charge state of the low voltage battery 120 to the charge state of the high voltage battery 110 is less than the desired ratio (that may or may not be predetermined), the charging switch 150 may also be turned on. The charging switch 150 in an on state may connect the high voltage battery 110 to the charging circuit 130, to allow the low voltage battery 120 to be charged using the high voltage battery 110.

The charging switch 150 may be controlled by the controller 140, or by a control signal received from an external apparatus, for example, the second external apparatus 170. The control signal may be received via the controller 140.

The low voltage battery monitor 160 may monitor the charge state of the low voltage battery 120. The high voltage battery monitor 165 may monitor the charge state of the high voltage battery 110. The low voltage battery monitor 160 and the high voltage battery monitor 165 may be configured individually or as a single monitor.

The low voltage battery monitor 160 and the high voltage battery monitor 165 may continue to monitor the charge state of the low voltage battery 120 and the charge state of the high voltage battery 110, and may transmit information on the monitored charge states to the controller 140, respectively. The controller 140 may control at least one of the charging circuit 130 and the charging switch 150 based on the received information.

As described above, the charging circuit 130, the low voltage battery monitor 160, and the high voltage battery monitor 165 are included in the battery pack 100. Accordingly, when the charge state of the low voltage battery 120 is reduced, the low voltage battery 120 may be charged using the high voltage battery 110.

For example, when the charge state of the low voltage battery 120 is reduced to be equal to or less than the desired charge state (that may or may not be predetermined), the low voltage battery 120 may not need to be separately charged. Accordingly, a user may use the battery pack 100 without a need to perform separate charging until both the charge state of the low voltage battery 120 and the charge state of the high voltage battery 110 are reduced to be equal to or less than the desired charge state (that may or may not be predetermined). In other words, the high voltage battery 110 and the low voltage battery 120 may be used as if a single battery is used.

Figure 2:
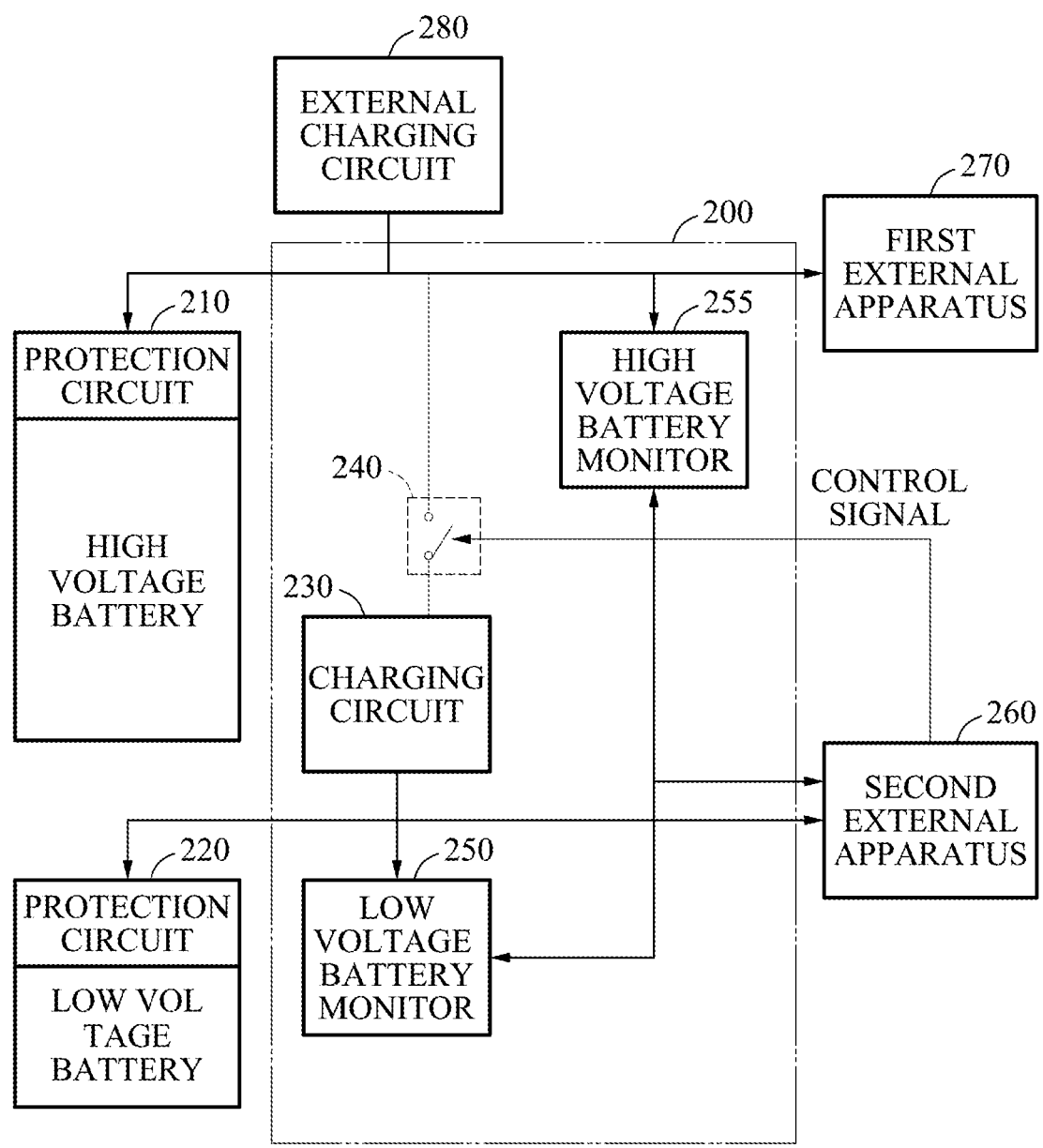
FIG. 2 illustrates an example of a charging control chip for controlling charging of a battery pack for providing different power sources according to some example embodiments.

FIG. 2 illustrates a charging control chip 200 for controlling charging of a battery pack for providing different power sources according to some example embodiments.

Referring to FIG. 2, the charging control chip 200 may include a charging circuit 230, a charging switch 240, a low voltage battery monitor 250, and a high voltage battery monitor 255. Unlike a configuration of the battery pack 100 of FIG. 1, a high voltage battery 210 and a low voltage battery 220 may be separate components separable from the charging control chip 200.

The high voltage battery 210 and the low voltage battery 220 may be configured as a single battery pack, and may each include a protection circuit configured to protect a battery against overcharge, over discharge, overcurrent, and the like.

The high voltage battery 210 may supply a second voltage that is higher than a first voltage supplied by the low voltage battery 220. The high voltage battery 210 may be selected to have a battery specification required by a first external apparatus 270. Additionally, the low voltage battery 220 may be selected to have a battery specification required by a second external apparatus 260.

The charging control chip 200 may be included in an apparatus including the first external apparatus 270 and the second external apparatus 260. For example, a component for controlling charging of a battery pack for providing different power sources may be included in the battery pack, similar to the battery pack 100, or in an apparatus requiring different power sources.

The charging circuit 230 may charge the low voltage battery 220 using the high voltage battery 210. For example, the charging circuit 230 may charge the low voltage battery 220, using an external power source, or the high voltage battery 210.

The charging control chip 200 may control the charging circuit 230 to charge the low voltage battery 220 using the high voltage battery 210 and, accordingly, an entire battery pack including the high voltage battery 210 and the low voltage battery 220 may not be charged despite a low charge state of the low voltage battery 220.

The high voltage battery 210 may be charged by an external charging circuit 280 using an external power source. The external charging circuit 280 configured to charge the high voltage battery 210 may be included in the charging control chip 200. However, due to a weight and a size of an apparatus including the charging control chip 200, the external charging circuit 280 may not be included in the apparatus including the charging control chip 200 so that the high voltage battery 210 may be charged by the external power source.

Because the charging control chip 200 may be included in the apparatus including the first external apparatus 270 and the second external apparatus 260, a separate controller configured to control the charging circuit 230 or the charging switch 240 may not be included in the charging control chip 200. The charging switch 240 may be connected between the charging circuit 230 and a connection terminal of the high voltage battery 210.

The charging control chip 200 may receive a control signal from the second external apparatus 260 to which power is supplied by the low voltage battery 220, and may control at least one of the charging circuit 230 and the charging switch 240, without including a separate controller.

When a charge state of the low voltage battery 220 is less than a desired charge state (that may or may not be predetermined), the second external apparatus 260 may generate a control signal to control the charging circuit 230 to charge the low voltage battery 220.

For example, when the low voltage battery 220 reaches a desired reserve capacity (that may or may not be preset) or a desired termination voltage (that may or may not be preset), the second external apparatus 260 may generate a control signal to control the charging circuit 230 to charge the low voltage battery 220.

Additionally, when a ratio of the charge state of the low voltage battery 220 to a charge state of the high voltage battery 210 is less than a desired ratio (that may or may not be predetermined), the second external apparatus 260 may generate a control signal to control the charging circuit 230 to charge the low voltage battery 220.

Thus, based on both the charge state of the low voltage battery 220 and the charge state of the high voltage battery 210, it is possible to prevent the charge state of the low voltage battery 220 and the charge state of the high voltage battery 210 from being excessively different from each other, and to efficiently utilize the high voltage battery 210 and the low voltage battery 220 as power sources.

When the charge state of the low voltage battery 220 is equal to or greater than the charge state of the high voltage battery 210, the second external apparatus 260 may control the charging circuit 230 to interrupt charging of the low voltage battery 220.

Additionally, when the low voltage battery 220 is being charged using the high voltage battery 210, the second external apparatus 260 may generate a control signal to supply power to the second external apparatus 260 using the high voltage battery 210.

The charging switch 240 may be connected between the high voltage battery 210 and the charging circuit 230. For example, when the charge state of the low voltage battery 220 is equal to or greater than the desired charge state (that may or may not be predetermined), the charging switch 240 may be turned off, to prevent the low voltage battery 220 from being charged using the high voltage battery 210.

When the charge state of the low voltage battery 220 is less than the desired charge state (that may or may not be predetermined), the charging switch 240 may be turned on, and may connect the high voltage battery 210 to the charging circuit 230, to allow the low voltage battery 220 to be charged using the high voltage battery 210.

When the ratio of the charge state of the low voltage battery 220 to the charge state of the high voltage battery 210 is less than the desired ratio (that may or may not be predetermined), the charging switch 240 may also be turned on.

The charging switch 240 may be controlled by a control signal generated by the second external apparatus 260, similarly to the charging circuit 230.

The low voltage battery monitor 250 may monitor the charge state of the low voltage battery 220. The high voltage battery monitor 255 may monitor the charge state of the high voltage battery 210. The low voltage battery monitor 250 and the high voltage battery monitor 255 may be configured individually or as a single monitor.

The low voltage battery monitor 250 and the high voltage battery monitor 255 may continue to monitor the charge state of the low voltage battery 220 and the charge state of the high voltage battery 210, and may transmit information on the monitored charge states to the second external apparatus 260, respectively.

A control signal used to control at least one of the charging circuit 230 and the charging switch 240 may be generated by the second external apparatus 260 as described above, however, there is no limitation thereto. It is obvious to one of ordinary skill in the art that the control signal may be generated by an apparatus including the charging control chip 200, instead of by the second external apparatus.

Figure 3:
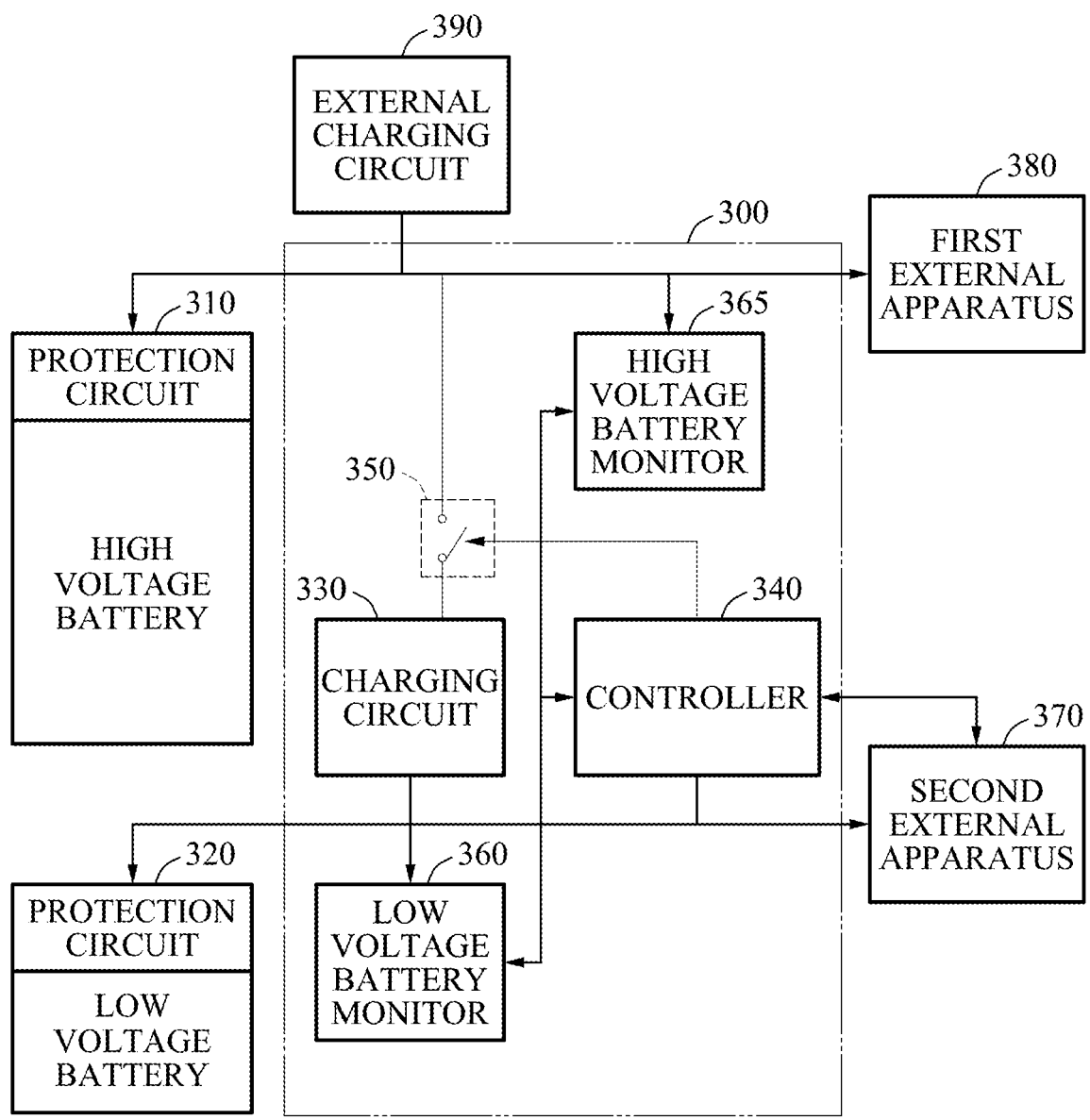
FIG. 3 illustrates another example of a charging control chip for controlling charging of a battery pack for providing different power sources according to some example embodiments.

FIG. 3 illustrates a charging control chip 300 for controlling charging of a battery pack for providing different power sources according to some example embodiments.

Referring to FIG. 3, the charging control chip 300 may include a charging circuit 330, a controller 340, a charging switch 350, a low voltage battery monitor 360, and a high voltage battery monitor 365.

The charging control chip 300 may include a separate controller, for example, the controller 340 configured to control at least one of the charging circuit 330 and the charging switch 350, unlike the charging control chip 200 of FIG. 2.

The controller 340 may control the charging circuit 330 to charge a low voltage battery 320, when a charge state of the low voltage battery 320 is less than a desired charge state (that may or may not be predetermined). For example, when the low voltage battery 320 reaches a desired reserve capacity (that may or may not be preset) or a desired termination voltage (that may or may not be preset), the controller 340 may control the charging circuit 330 to charge the low voltage battery 320.

Additionally, when a ratio of the charge state of the low voltage battery 320 to a charge state of a high voltage battery 310 is less than a desired ratio (that may or may not be predetermined), the controller 340 may control the charging circuit 330 to charge the low voltage battery 320. Thus, based on both the charge state of the low voltage battery 320 and the charge state of the high voltage battery 310, it is possible to prevent the charge state of the low voltage battery 320 and the charge state of the high voltage battery 310 from being excessively different from each other, and to efficiently utilize the high voltage battery 310 and the low voltage battery 320 as power sources.

When the charge state of the low voltage battery 320 is equal to or greater than the charge state of the high voltage battery 310, the controller 340 may control the charging circuit 330 to interrupt charging of the low voltage battery 320. For example, when the charge state of the low voltage battery 320 is equal to or greater than the charge state of the high voltage battery 310, the controller 340 may determine that charging of the low voltage battery 320 using the high voltage battery 310 is completed, and may control the charging circuit 330 to interrupt the charging.

The controller 340 may supply power to a second external apparatus 370 using the high voltage battery 310, instead of using the low voltage battery 320, when the low voltage battery 320 is being charged using the high voltage battery 310. Because the low voltage battery 320 is charged using the high voltage battery 310, the second external apparatus 370 may be normally operated using the high voltage battery 310 during the charging of the low voltage battery 320.

The description of FIG. 2 is also applicable to the charging circuit 330, the charging switch 350, the low voltage battery monitor 360 and the high voltage battery monitor 365 in the charging control chip 300 and, accordingly, further description of the charging circuit 330, the charging switch 350, the low voltage battery monitor 360, and the high voltage battery monitor 365 will be omitted herein.

A first external apparatus 380 may receive a power supply from the high voltage battery 310, and the second external apparatus 370 may receive a power supply from the low voltage battery 320. The description of FIG. 2 is also applicable to the second external apparatus 370, the first external apparatus 380, and an external charging circuit 390 and, accordingly, further description of the second external apparatus 370, the first external apparatus 380, and the external charging circuit 390 will be omitted herein.

For example, the charging control chips 200 and 300 may be included in an apparatus requiring different power sources, not in a battery pack for providing different power sources. In some example embodiments, similarly to the battery pack 100, a user may use the charging control chips 200 and 300 without a need to perform separate charging until all the charge states of the low voltage batteries 220 and 320 and the high voltage batteries 210 and 310 are reduced to be equal to or less than the desired charge state (that may or may not be predetermined). In other words, the high voltage batteries 210 and 310 and the low voltage batteries 220 and 320 may be used as if a single battery is used.

FIG. 4 illustrates an example of a method of charging a battery pack for providing different power sources according to some example embodiments. The method of FIG. 4 may be performed by the battery pack 100 of FIG. 1.

Referring to FIG. 4, in operation 410, the low voltage battery monitor 160 may monitor the charge state of the low voltage battery 120. The low voltage battery monitor 160 may transmit information on the charge state of the low voltage battery 120 to the controller 140.

In operation 420, the controller 140 may compare the charge state of the low voltage battery 120 to the desired charge state (that may or may not be predetermined). The desired charge state (that may or may not be predetermined) may be set in advance, and may be changed by settings of a user and a manufacturer. For example, when the charge state of the low voltage battery 120 is equal to or greater than the desired charge state (that may or may not be predetermined), the method may revert to operation 410 to continue to monitor the charge state of the low voltage battery 120.

When the charge state of the low voltage battery 120 is less than desired charge state (that may or may not be predetermined), the controller 140 may control the low voltage battery 120 to be charged using the high voltage battery 110 by turning on the charging switch 150 in operation 430.

When the low voltage battery 120 is being charged using the high voltage battery 110, the controller 140 may supply power to the second external apparatus 170 using the high voltage battery 110, instead of using the low voltage battery 120.

In operation 440, the low voltage battery monitor 160 and the high voltage battery monitor 165 may monitor the charge state of the low voltage battery 120 and the charge state of the high voltage battery 110, respectively. The low voltage battery monitor 160 and the high voltage battery monitor 165 may transmit, to the controller 140, information on the charge state of the low voltage battery 120 and information on the charge state of the high voltage battery 110.

In operation 450, the controller 140 may compare the charge state of the low voltage battery 120 to the charge state of the high voltage battery 110. When the charge state of the low voltage battery 120 is less than the charge state of the high voltage battery 110, the controller 140 may control the charging switch 150 to remain in an on state, and allow the low voltage battery 120 to be charged using the high voltage battery 110.

When the charge state of the low voltage battery 120 is equal to or greater than the charge state of the high voltage battery 110, the controller 140 may turn off the charging switch 150 in operation 460. For example, when the charge state of the low voltage battery 120 is equal to or greater than the charge state of the high voltage battery 110, the controller 140 may determine that charging of the low voltage battery 120 using the high voltage battery 110 is completed, and may turn off the charging switch 150.

When the charging switch 150 is turned off, the method may revert to operation 410 and operations 410 to 460 may be repeatedly performed to continue to manage the charge state of the low voltage battery 120.

FIG. 5 illustrates another example of a method of charging a battery pack for providing different power sources according to some example embodiments. The method of FIG. 5 may be performed by the battery pack 100 of FIG. 1.

Referring to FIG. 5, in operation 510, the low voltage battery monitor 160 and the high voltage battery monitor 165 may monitor the state of the low voltage battery 120 and the charge state of the high voltage battery 110, respectively. The low voltage battery monitor 160 and the high voltage battery monitor 165 may transmit, to the controller 140, information on the charge state of the low voltage battery 120 and information on the charge state of the high voltage battery 110.

In operation 520, the controller 140 may compare the ratio of the charge state of the low voltage battery 120 and the charge state of the high voltage battery 110 to the desired ratio (that may or may not be predetermined). The desired ratio (that may or may not be predetermined) may be set in advance, and may be changed by settings of a user and a manufacturer. When the ratio is determined to be equal to or greater than the desired ratio (that may or may not be predetermined), the method may revert to operation 510 to continue to monitor the charge state of the low voltage battery 120 and the charge state of the high voltage battery 110.

When the ratio is determined to be less than the desired ratio (that may or may not be predetermined), the controller 140 may control the low voltage battery 120 to be charged using the high voltage battery 110, by turning on the charging switch 150 in operation 530. Accordingly, based on both the charge state of the low voltage battery 120 and the charge state of the high voltage battery 110, it is possible to prevent the charge state of the low voltage battery 120 and the charge state of the high voltage battery 110 from being excessively different from each other, and to efficiently utilize the high voltage battery 110 and the low voltage battery 120 as power sources.

In operation 540, the low voltage battery monitor 160 and the high voltage battery monitor 165 may monitor the charge state of the low voltage battery 120 and the charge state of the high voltage battery 110, respectively. The low voltage battery monitor 160 and the high voltage battery monitor 165 may transmit, to the controller 140, the information on the charge state of the low voltage battery 120 and the information on the charge state of the high voltage battery 110.

In operation 550, the controller 140 may compare the charge state of the low voltage battery 120 to the charge state of the high voltage battery 110. When the charge state of the low voltage battery 120 is less than the charge state of the high voltage battery 110, the controller 140 may control the charging switch 150 to remain in an on state, and allow the low voltage battery 120 to be charged using the high voltage battery 110.

When the charge state of the low voltage battery 120 is equal to or greater than the charge state of the high voltage battery 110, the controller 140 may turn off the charging switch 150 in operation 560. For example, when the charge state of the low voltage battery 120 is equal to or greater than the charge state of the high voltage battery 110, the controller 140 may determine that charging of the low voltage battery 120 using the high voltage battery 110 is completed, and may turn off the charging switch 150.

When the charging switch 150 is turned off, the method may revert to operation 510 and operations 510 to 560 may be repeatedly performed to continue to manage the charge state of the low voltage battery 120.

The algorithms discussed in this application (e.g., for charging battery packs) may be used in more general purpose apparatuses and/or methods of controlling apparatuses. For example, the algorithms may be used in apparatuses for more general electrical or electronic systems and/or for controlling such apparatuses so as to provide power to more general electrical or electronic systems.

The methods described above may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiment, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A battery pack for providing different power sources, the battery pack comprising:
   a low voltage battery configured to supply a first voltage;
   a high voltage battery configured to supply a second voltage, the second voltage being higher than the first voltage;
   a charging circuit configured to charge the low voltage battery using the high voltage battery;
   an external charging circuit configured to charge the low voltage battery and the high voltage battery using an external power source; and
   a controller configured to control the external charging circuit to charge both the low voltage battery and the high voltage battery in response to determining that a charge state of the low voltage battery is below a first reference value and a charge state of the high voltage battery is below a second reference value.

2. The battery pack of claim 1, further comprising:
   a charging switch configured to connect the high voltage battery to the charging circuit,
   wherein when the charge state of the low voltage battery is less than a desired charge state, the controller turns on the charging switch to allow the low voltage battery to be charged.

3. The battery pack of claim 1, further comprising:
   a monitor configured to monitor the charge state of the low voltage battery and the charge state of the high voltage battery.

4. The battery pack of claim 3, wherein the monitor is configured to transmit information on the charge state of the low voltage battery and the charge state of the high voltage battery to the controller.

5. The battery pack of claim 4, wherein when the charge state of the low voltage battery is less than a desired charge state, the controller is configured to control the charging circuit to charge the low voltage battery.

6. The battery pack of claim 4, wherein when the charge state of the low voltage battery is equal to or greater than the charge state of the high voltage battery, the controller is configured to control the charging circuit to interrupt charging of the low voltage battery.

7. The battery pack of claim 1, wherein the first voltage is configured to drive a circuit, and wherein the second voltage is configured to drive a motor.

8. The battery pack of claim 1, wherein the controller is configured to control the charging circuit based on a charging control signal received from an external apparatus.

9. The battery pack of claim 1, wherein during charging of the low voltage battery, the controller is configured to control power to be supplied to an external apparatus using the high voltage battery.

10. A charging control chip for controlling charging of a battery pack for providing different power sources, the charging control chip comprising:
   a monitor configured to monitor a charge state of a low voltage battery and a charge state of a high voltage battery, the low voltage battery being configured to supply a first voltage, the high voltage battery being configured to supply a second voltage, and the second voltage being higher than the first voltage;
   a charging circuit configured to charge the low voltage battery using the high voltage battery;
   a charging switch configured to connect the charging circuit to a connection terminal of the high voltage battery; and
   a controller configured to control an external charging circuit to charge both the low voltage battery and the high voltage battery in response to determining that the charge state of the low voltage battery is below a first reference value and the charge state of the high voltage battery is below a second reference value.

11. The charging control chip of claim 10, wherein the charging switch is turned on or off based on a charging control signal received from an external apparatus.

12. The charging control chip of claim 10, wherein when the charge state of the low voltage battery is equal to or greater than the charge state of the high voltage battery, the controller is configured to turn off the charging switch.

13. A method of charging a battery pack for providing different power sources, the method comprising:
   turning on a charging switch based on a charge state of a low voltage battery having a first voltage and a charge state of a high voltage battery, the charging switch being configured to connect the high voltage battery having a second voltage to a charging circuit of the low voltage battery, and the second voltage being higher than the first voltage; and
   charging, using an external charging circuit, both the low voltage battery and the high voltage battery in response to determining that a charge state of the low voltage battery is below a first reference value and a charge state of the high voltage battery is below a second reference value.

14. The method of claim 13, further comprising:
   turning off the charging switch when the charge state of the low voltage battery is equal to or greater than the charge state of the high voltage battery.

15. The method of claim 13, wherein the first voltage is configured to drive a circuit, and wherein the second voltage is configured to drive a motor.

16. The method of claim 13, wherein the turning on of the charging switch comprises:
   monitoring the charge state of the low voltage battery and a charge state of the high voltage battery; and
   comparing the monitored charge state of the low voltage battery to a desired charge state based on information on the monitored charge states of the low voltage battery and the high voltage battery.

17. The method of claim 13, wherein the turning on of the charging switch comprises, when a charge state of a low voltage battery having a first voltage is less than a desired charge state, turning on the charging switch.

* * * * *